(12) United States Patent
Brun et al.

(10) Patent No.: US 7,690,195 B2
(45) Date of Patent: Apr. 6, 2010

(54) DILUTION AND DISPERSION DEVICE FOR THE EXHAUST AND/OR COOLING GASES OF A VEHICLE'S ENGINE

(75) Inventors: Michel Brun, Maurepas (FR); Sylvain Carlier, Guyancourt (FR); Benoit Pizon, Villiers le Bacle (FR)

(73) Assignee: Nexter Systems, Roanne (FR)

( * ) Notice: Subject to any disclaimer, the term of this patent is extended or adjusted under 35 U.S.C. 154(b) by 1213 days.

(21) Appl. No.: 10/797,014

(22) Filed: Mar. 11, 2004

(65) Prior Publication Data

US 2005/0005594 A1 Jan. 13, 2005

(30) Foreign Application Priority Data

Mar. 13, 2003 (FR) .................................. 03 03124

(51) Int. Cl.
 *F02B 35/00* (2006.01)
(52) U.S. Cl. ............................. 60/315; 60/272; 60/309; 60/324; 123/306; 123/592; 417/94
(58) Field of Classification Search .................. 60/272, 60/309, 315, 324; 123/306, 592; 416/94
 See application file for complete search history.

(56) References Cited

U.S. PATENT DOCUMENTS

| 2,112,534 | A | | 3/1938 | Keen ............................. 60/32 |
| 2,518,660 | A | * | 8/1950 | Browne ....................... 60/602 |
| 4,352,638 | A | * | 10/1982 | Vallance ...................... 417/64 |
| 4,875,829 | A | * | 10/1989 | Van der Woude .............. 416/2 |
| 4,909,346 | A | * | 3/1990 | Torkelson ................... 181/213 |
| 4,931,026 | A | * | 6/1990 | Woodland .................... 440/38 |
| 5,542,249 | A | * | 8/1996 | Heath .......................... 60/293 |
| 5,709,529 | A | | 1/1998 | Parzych ...................... 415/119 |
| 5,941,069 | A | * | 8/1999 | Heath .......................... 60/307 |
| 6,158,412 | A | * | 12/2000 | Kim ........................... 123/306 |
| 7,073,626 | B2 | * | 7/2006 | Weinhold et al. ........... 181/279 |
| 7,104,251 | B2 | * | 9/2006 | Kim ........................... 123/306 |

* cited by examiner

*Primary Examiner*—Binh Q Tran
(74) *Attorney, Agent, or Firm*—Steptoe & Johnson LLP

(57) ABSTRACT

The invention relates to a dilution and dispersion device for the exhaust and/or cooling gases of a vehicle's engine, that incorporates blades and a hub. The hub of said device incorporates means intended to reduce the loss in the gaseous flow rate generated by said gases. The flow rate loss reduction means are constituted by one or several openings in said hub or by a profiled element allowing said gases to be defected towards said blades. The blades are fastened to a ring.

5 Claims, 4 Drawing Sheets

DILUTION AND DISPERSION DEVICE FOR THE EXHAUST AND/OR COOLING GASES OF A VEHICLE'S ENGINE

BACKGROUND OF THE INVENTION

The technical scope of the present invention is that of devices intended to reduce the visible and infrared signatures of military vehicles from their exhaust gases.

The evolution of thermal camera and sensor technology allows hot sources to be detected over very large distances in a land environment. Such sources may be the exhaust and cooling gases from a vehicle engine. To improve stealth with respect to the evolution of infrared sensors, it is thus necessary for the level of energy radiated by the exhaust and cooling flows of military vehicles to be reduced.

Publications already exist that propose devices to evenly dilute the exhaust gases of a military vehicle. This is the case of patent FR-2776705, which describes a device wherein the air is cooled in a cooling zone before being ejected via a shuttered outlet. These devices, however, have a major drawback. Indeed, although the temperature of the gases ejected is greatly reduced, these gases can be spotted because of the shape of their output flow whose trace can be seen in the form of a wreath by infrared vision equipment.

One solution to rapidly dissipate this wreath consists in applying a jet disperser at the exhaust outlet whose blades radially disperse the gaseous flow. However, a major drawback to this type of solution lies in the fact that such a jet disperser constitutes an obstacle to the gaseous flow thereby reducing the performances of the vehicle (in particular during the vehicle's acceleration phases).

SUMMARY OF THE INVENTION

The aim of the present invention is to supply a device allowing the gases to be dissipated and diluted rapidly by dividing and deviating the initial gaseous wreath flow, without necessarily constituting any major obstacle to it, to help it dissipate into the surrounding air.

The invention thus relates to a dilution and dispersion device for the exhaust and/or cooling gases of a vehicle's engine, that incorporates blades and a hub, wherein the hub of the device incorporates means intended to reduce the loss in the gaseous flow rate.

According to another characteristic of the invention, the flow rate loss reduction means are constituted by at least one opening in the hub.

According to yet another characteristic, the number of openings, their diameter and their arrangement are determined according to the permeability which the device is to be given.

According to another characteristic, the flow rate loss reduction means are constituted by a profiled element allowing the gases to be defected towards the blades.

According to another characteristic, these blades are fastened to a ring.

According to another characteristic, the ring is free to rotate with respect to the hub.

According to another characteristic, the ring is integral with the hub.

A first advantage of the device according to the invention lies in the ease with which it can be mounted onto a vehicle, without requiring the adaptation of any of the equipment already equipping the vehicle.

Another advantage lies in the ease with which the device is implemented and in its relatively reduced cost.

Another advantage lies in the fact that this device has relatively little influence on the performances of the vehicle it equips.

BRIEF DESCRIPTION OF THE DRAWINGS

Other characteristics, particulars and advantages of the invention will become more apparent from the following description, given by way of illustration and with reference to the appended drawings, in which.

DETAILED DESCRIPTION OF PREFERRED EMBODIMENTS

Figure 1A:
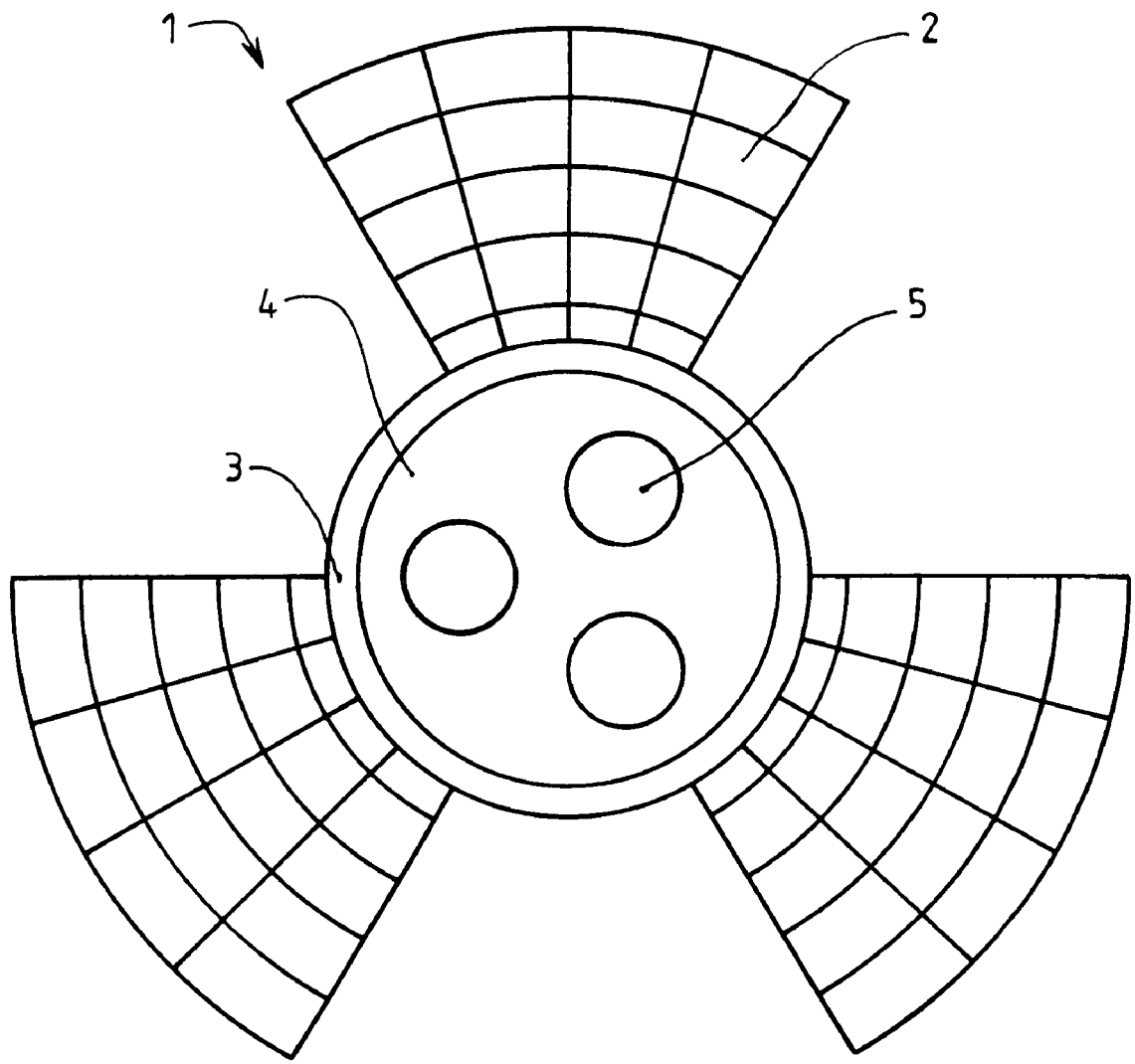
FIG. 1a shows a front view of a first embodiment of the device according to the invention.
Figure 1B:
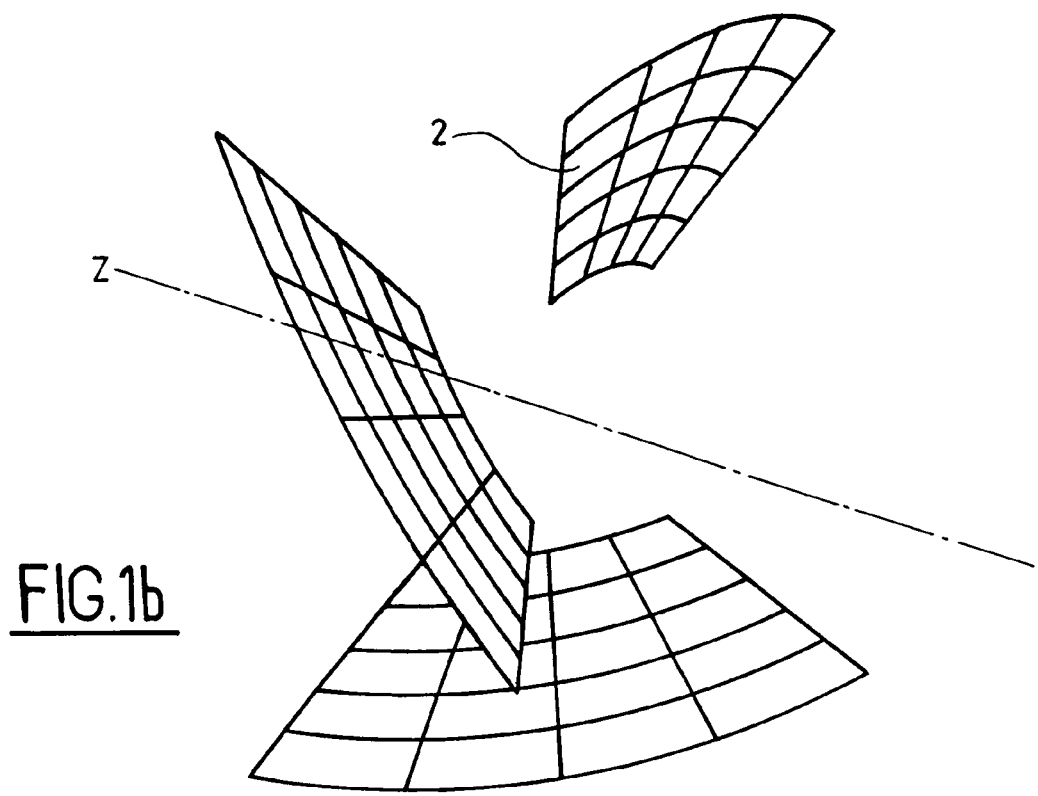
FIG. 1b is a three-quarter view of the device's blades according to the same embodiment.

FIG. 1a is a front view that represents a first embodiment of an exhaust gas dilution and dispersion device 1, also termed jet disperser, according to the invention and intended to be mounted onto the outlet of an exhaust pipe (not shown) for the gases of a vehicle's engine, for example a military vehicle. FIG. 1b shows a three-quarter view of the blades of this same jet disperser. Naturally, this device may be mounted without any notable modification onto the cooling air evacuation pipe of the engine or on any other hot element of the vehicle.

The jet disperser 1 is composed of blades 2, a ring 3, and a hub 4. The blades 2 are integral with the ring 3 which, in this embodiment, is free to rotate with respect to the hub 4. The tilt of the blades 2 with respect to their axis of rotation Z is between 20° and 75°. This angle is constant, in the case of plane blades. In the case of corkscrewed blades, the tilt gradually varies according to the radius. These blades 2 do not cover the full circumference of the ring 3, and between these blades obstacle-free sectors allow a minimal air flow.

The hub 4 is provided with circular openings 5. The number and diameter of the openings is determined according to the permeability that is to be given to the device.

This embodiment allows a substantially unidirectional flow to be combined with a radially dispersed flow. The unidirectional flow is linked to the openings 5 and the dispersed flow is linked to the blades 2. The dispersion of the gaseous flow by the blades depends on their angle. A high angle produces little counter-pressure in the exhaust pipe but gives a relatively limited dilution, whereas a low angle induces excellent dilution but with a more marked counter-pressure, thus a lower flow rate. The number of openings and their diameter allow a more or less substantial unidirectional flow. Indeed, if there are no openings, the unidirectional flow is nil. The flow rate is therefore much reduced but there is a better dilution of the flow. On the contrary, a large number of openings and/or openings of large diameter generate a substantial unidirectional flow, thereby limiting the loss in flow rate but attenuating the dilution of the gases.

The number of openings, their arrangement and their diameter will thus be calculated so as to adapt the dilution of the exhaust gases according to the stealth required and the performances required from the vehicle.

Figure 2:
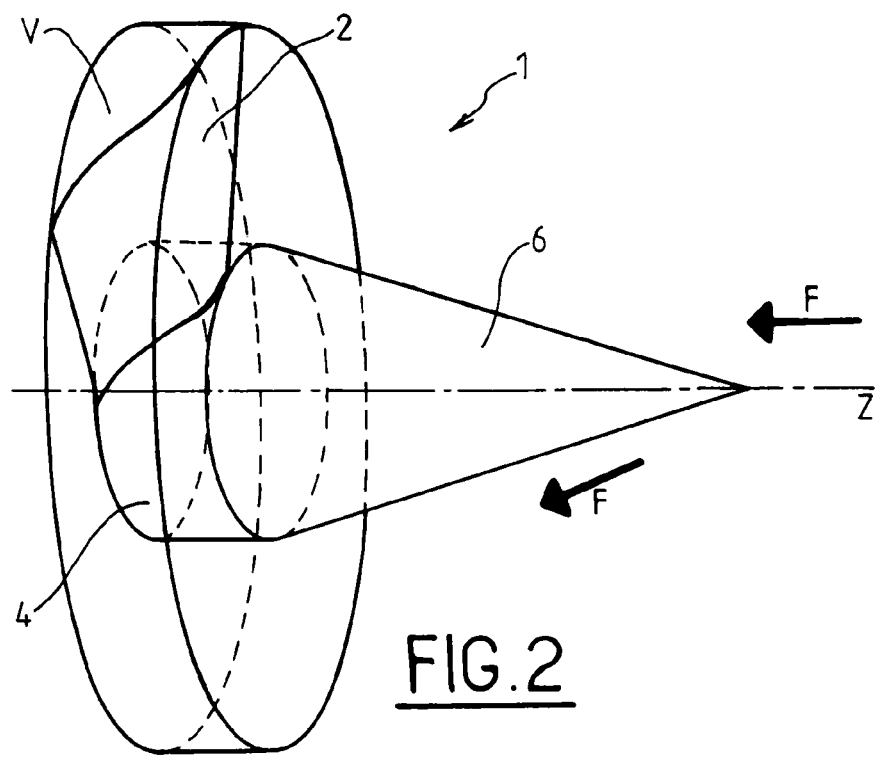
FIG. 2 is a three-quarter view of a second embodiment of the invention, FIG. 3a models the flow of cooling gases from a vehicle that is not equipped with a device according to the invention, and FIG. 3b models the flow of cooling gases from a vehicle that is equipped with a device according to the invention.

FIG. 2 is a three-quarter view showing a second embodiment of the jet disperser according to the invention.

In this embodiment, the central hub 4 has no openings but is fitted with a conical profiled element 6 intended to orient the gaseous flow towards the blades 2. These blades are either fastened to the central hub 4, or are free to rotate around axis Z and describe a volume V. The cone base is connected to the hub 4 by known means, the point being directed to the upstream direction of the flow.

In this embodiment, the gas flow F is intended to be deviated, initially in parallel to the axis Z then towards the blades 2 whilst minimising the loss in flow rate. The shape of the profiled element 6 will thus be defined according to the characteristics of the flow, the blades 2 and the desired results.

Figure 3A:
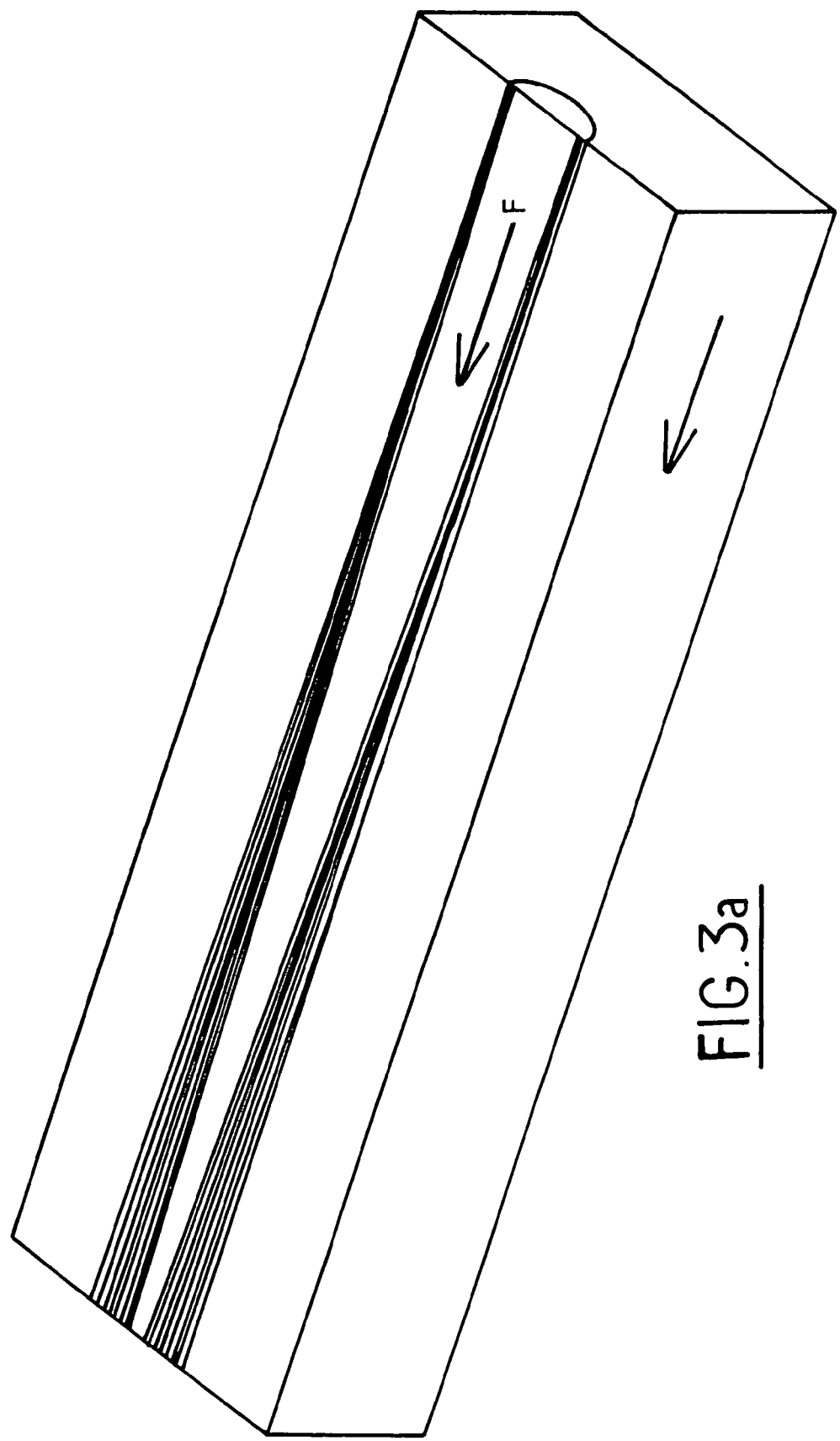
Figure 3B:
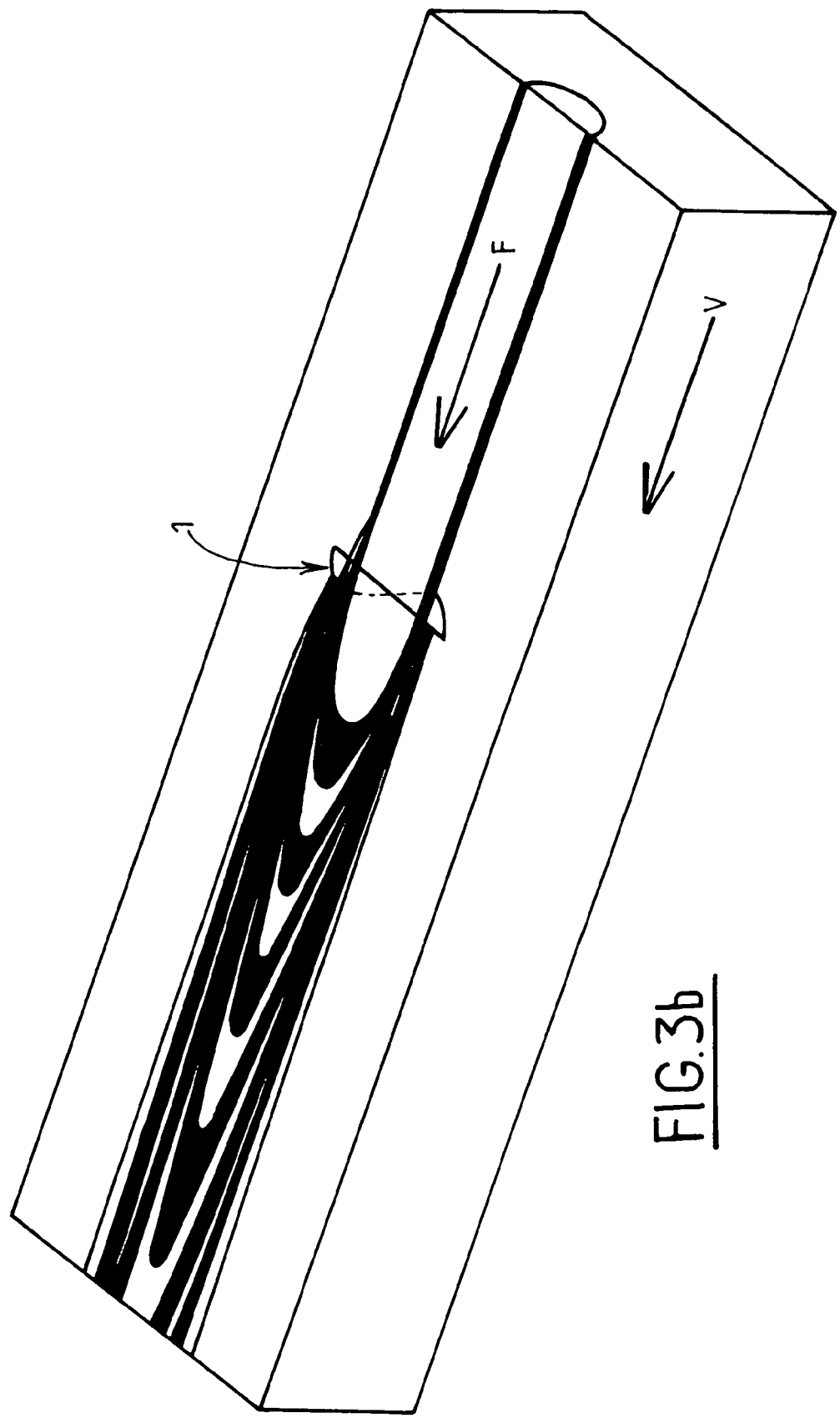

FIGS. 3*a* and 3*b* model the cooling gas flow from a vehicle. FIG. 3*a* models a gaseous flow F from the cooling circuit of a vehicle that is not fitted with the dilution device according to the invention. In this case, the exhaust flow is substantially tubular and the temperature at the centre of the flow remains high.

FIG. 3*a* models the gaseous flow from the same cooling circuit, but one fitted with a dilution device according to the invention. In this case, the dilution conditions have been modelled to be the most unfavourable (the gas temperature is of 160° C. and the air temperature 30° C., the gaseous flow F and the wind V are oriented in the same direction). The alternation of dark and light bands corresponds to gradients of 10° C. FIG. 3*b* shows that the invention allows the temperature of the flow to be rapidly reduced, both at its periphery and in its centre.

These embodiments of the invention are given by way of illustration. Other embodiments are possible. The conical profiled element 6 in FIG. 2 may notably be replaced by a profiled element of a hemispherical, helix-conical, hyperbolical, parabolic, or semi-elliptical shape, or any other profile whose shape allows the gaseous flow to be deflected towards the blades.

For all the embodiments, the number of blades and their tilt will be determined according to the orientation that is to be given to the gaseous flow.

What is claimed is:

1. A dilution and dispersion device for exhaust gases from a vehicle engine, comprising:
   a hub, within an exhaust channel, and having at least one opening therein for permitting substantially unidirectional flow of exhaust gases through the dilution and dispersion device,
   a ring encircling said hub and freely rotatable with respect to said hub, and
   blades fixed to said ring, for radially dispersing exhaust gases, such that the blades mix output flows of gases through said opening and said blades to dilute a temperature profile of such exhaust gases.

2. A dilution and dispersion device according to claim 1, wherein a number of said at least one opening, a diameter of said at least one opening, and an arrangement of said at least one opening, correspond to a predetermined permeability level of said device.

3. A dilution and dispersion device according to claim 1, wherein said hub comprises a profiled element for deflecting gases towards said blades.

4. The dilution and dispersion device according to claim 1, wherein the device is non-motorized.

5. An exhaust system comprising:
   an exhaust channel for emitting exhaust gases, and
   a dilution and dispersion device mounted to an end of said channel so that any exhaust gas emitted from said channel must pass through said dilution and dispersion device, said dilution and dispersion device comprising:
      a hub which includes at least one hole for permitting a substantially unidirectional flow of exhaust gases therethrough;
      a ring attached to and encircling said hub and freely rotatable with respect to said hub, and
      a plurality of blades attached to said ring, said blades for dispersing a flow of exhaust gases passing through said blades, thereby mixing the dispersional and unidirectional flows of gases to dilute a temperature profile of such exhaust gases.

\* \* \* \* \*